(12) United States Patent
Cho

(10) Patent No.: US 12,194,891 B2
(45) Date of Patent: Jan. 14, 2025

(54) ELECTRIFIED VEHICLE AND REGENERATIVE BRAKING CONTROL METHOD OF THE SAME

(71) Applicants: Hyundai Motor Company, Seoul (KR); Kia Corporation, Seoul (KR)

(72) Inventor: Jin Kyeom Cho, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 232 days.

(21) Appl. No.: 18/099,437

(22) Filed: Jan. 20, 2023

(65) Prior Publication Data

US 2024/0083254 A1 Mar. 14, 2024

(30) Foreign Application Priority Data

Sep. 14, 2022 (KR) .................. 10-2022-0115701

(51) Int. Cl.
*B60L 7/18* (2006.01)
*B60Q 1/44* (2006.01)

(52) U.S. Cl.
CPC ................ *B60L 7/18* (2013.01); *B60Q 1/444* (2013.01)

(58) Field of Classification Search
CPC .......... B60L 7/18; B60L 7/10; B60L 2240/60; B60L 2240/645; B60L 2250/26; B60L 15/2009; B60Q 1/444; B60Q 1/44; B60Y 2200/91; B60Y 2200/92; Y02T 90/40

USPC ........................................................ 701/70
See application file for complete search history.

(56) References Cited

U.S. PATENT DOCUMENTS

2021/0171041 A1\* 6/2021 Son ........................... B60T 1/10
2021/0354621 A1\* 11/2021 Son ......................... B60Q 1/302
2022/0402367 A1\* 12/2022 Son ........................... B60L 7/18

FOREIGN PATENT DOCUMENTS

| CN | 104755324 A | 7/2015 |
|---|---|---|
| JP | 2012-153294 | 8/2012 |
| JP | 6186619 | 8/2017 |
| JP | 2018-184112 | 11/2018 |
| KR | 20-1999-001472 U | 1/1999 |
| KR | 10-2010-0061208 | 6/2010 |
| KR | 10-2015-0001546 | 1/2015 |
| KR | 10-2019-0080061 | 7/2019 |
| KR | 10-2019-0128853 | 11/2019 |
| WO | WO2013-085633 | 6/2013 |
| WO | WO2015-040729 | 3/2015 |

\* cited by examiner

*Primary Examiner* — Hai H Huynh
(74) *Attorney, Agent, or Firm* — Morgan, Lewis & Bockius LLP

(57) ABSTRACT

An electrified vehicle and a regenerative braking control method of the same include performing regenerative braking based on a travel environment while driving of the vehicle, determining the number of turn-on/off times of a brake lamp for a reference time during execution of the regenerative braking based on the travel environment, and adjusting a regenerative braking torque of a drive motor based on the determined number of turn-on/off times of the brake lamp.

20 Claims, 7 Drawing Sheets

ELECTRIFIED VEHICLE AND REGENERATIVE BRAKING CONTROL METHOD OF THE SAME

CROSS-REFERENCE TO RELATED APPLICATION

The present application claims priority to Korean Patent Application No. 10-2022-0115701, filed on Sep. 14, 2022, the entire contents of which is incorporated herein for all purposes by this reference.

BACKGROUND OF THE PRESENT DISCLOSURE

Field of the Present Disclosure

The present disclosure relates to an electrified vehicle and a regenerative braking control method of the same, which are configured to prevent a flickering phenomenon of a brake lamp from occurring during regenerative braking based on a travel environment of the electrified vehicle.

Description of Related Art

In pace with recently increased interest in the environment, active research into electrified vehicles provided with an electric motor (or a drive motor) as a driving source is being conducted. As examples of electrified vehicles, there are an electric vehicle (EV), a hybrid electric vehicle (HEV), a fuel cell electric vehicle (FCEV), etc. In such an electrified vehicle, regenerative braking is performed to recover energy generated during braking of the vehicle or coasting of the vehicle by inertia, through electricity generation of a drive motor, recharging a battery with the recovered energy. In detail, the electrified vehicle may achieve an enhancement in fuel economy and efficient use of energy by recovering energy using the drive motor during braking or coasting of the electrified vehicle, and recharging the battery with the recovered energy. A regenerative braking system provided in the electrified vehicle may convert kinetic energy of the vehicle into electrical energy during braking of the vehicle, may store the electrical energy in the battery, and may then use the stored energy, for driving of the drive motor, and accordingly, fuel economy while driving of the vehicle may be enhanced.

Meanwhile, a smart regenerative braking system has recently been applied to electrified vehicles. The smart regenerative braking system may vary a regenerative braking level during execution of regenerative braking using information according to a travel environment such as a distance from the electrified vehicle to a front vehicle, a predicted remaining time to collision with the front vehicle under maintenance of a current vehicle speed, navigation information, etc. Under the condition that there is no pedal manipulation of the driver in an activated state of the smart regenerative braking system, regenerative braking is performed when regenerative braking conditions are satisfied, for example, when the vehicle comes close to the front vehicle or when a curved section having a predetermined curvature or greater exists in front of the vehicle. In the instant case, when an acceleration by the regenerative braking is lower than a predetermined reference (for example, $-1.3$ m/s$^2$), a brake lamp of the vehicle is turned on even though a brake pedal is not manipulated. When the driver manipulates an accelerator pedal in the turn-on state of the brake lamp, for acceleration, the brake lamp is turned off.

Accordingly, in the electrified vehicle, in which the smart regenerative braking system is employed, when acceleration of a level causing turn-on of the brake lamp is generated during execution of regenerative braking, turn-on/off of the brake lamp of the vehicle may be repeated in accordance with frequent entrance and release of regenerative braking because the brake lamp is turned off whenever the accelerator pedal is intermittently manipulated. As turn-on/off of the brake lamp is repeated, the driver of a vehicle travelling in rear may be displeased or inconvenienced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a regenerative braking control method of an electrified vehicle configured to prevent occurrence of a flickering phenomenon of a brake lamp caused by manipulation of an accelerator pedal during regenerative braking based on a travel environment of the electrified vehicle.

It will be appreciated by persons skilled in the art to which the present disclosure pertains that technical problems to be solved by the present disclosure are not limited to the above-described technical problems, and other technical problems will be more clearly understood from the following description.

In accordance with an aspect of the present disclosure, the above and other objects may be accomplished by the provision of a regenerative braking control method of an electrified vehicle including performing regenerative braking based on a travel environment while driving of the vehicle, determining the number of turn-on/off times of a brake lamp for a reference time during execution of the regenerative braking based on the travel environment, and adjusting a regenerative braking torque of a drive motor based on the determined number of turn-on/off times of the brake lamp.

For example, the travel environment may include at least one of a distance from the electrified vehicle to a front vehicle, an estimated collision time from the electrified vehicle to the front vehicle or navigation information.

For example, the determining the number of turn-on/off times may include determining, as the number of turn-on/off times, the number of times when the brake lamp is switched from an ON state to an OFF state or from the OFF state to the ON state for the reference time during execution of the regenerative braking of the vehicle.

For example, the adjusting a regenerative braking torque may include adjusting the regenerative braking torque of the drive motor in accordance with a section corresponding to the determined number of turn-on/off times of the brake lamp from among a plurality of predetermined sections respectively having different ranges of numbers of turn-on/off times.

For example, adjusting the regenerative braking torque of the drive motor in accordance with the section may include adjusting at least one of limiting of a regenerative braking torque variation rate and lowering of a predetermined regenerative braking level.

For example, the adjusting the regenerative braking torque of the drive motor in accordance with the section may include adjusting an acceleration of the electrified vehicle according to the regenerative braking to be lower than a predetermined acceleration by adjusting the at least one of the limiting of the regenerative braking torque variation rate and the lowering of the predetermined regenerative braking level.

For example, the adjusting the regenerative braking torque may include limiting a regenerative braking torque variation rate of the drive motor when the determined number of turn-on/off times of the brake lamp corresponds to a first section from among the plurality of predetermined sections.

For example, the limiting a regenerative braking torque variation rate may include reducing variation in regenerative braking torque per hour of the drive motor in a negative (−) direction during the execution of the regenerative braking.

For example, the adjusting the regenerative braking torque may further include lowering the predetermined regenerative braking level when the determined number of turn-on/off times of the brake lamp corresponds to a second section having a greater range of turn-on/off times than the range of turn-on/off times of the first section.

For example, the adjusting the regenerative braking torque may further include limiting the regenerative braking torque variation rate of the drive motor and lowering the predetermined regenerative braking level when the determined number of turn-on/off times of the brake lamp corresponds to a third section including a greater range of turn-on/off times than the range of turn-on/off times of the second section among the plurality of predetermined sections.

In accordance with another aspect of the present disclosure, there is provided an electrified vehicle including a brake lamp configured to be repeatedly turned on or off in accordance with an acceleration and a deceleration of the vehicle, and a control unit configured to determine the number of turn-on/off times of the brake lamp for a reference time during execution of regenerative braking based on a travel environment while driving of the vehicle and to adjust a regenerative braking torque of a drive motor based on the determined number of turn-on/off times of the brake lamp.

For example, the control unit may determine, as the number of turn-on/off times, the number of times when the brake lamp is switched from an ON state to an OFF state or from the OFF state to the ON state for the reference time during execution of the regenerative braking of the vehicle.

For example, the control unit may adjust the regenerative braking torque of the drive motor in accordance with a section corresponding to the determined number of turn-on/off times of the brake lamp from among a plurality of predetermined sections respectively having different ranges of numbers of turn-on/off times.

For example, upon adjusting the regenerative braking torque of the drive motor, the control unit may adjust at least one of limiting of a regenerative braking torque variation rate and lowering of a predetermined regenerative braking level.

For example, the control unit may adjust an acceleration of the electrified vehicle according to the regenerative braking to be lower than a predetermined acceleration by adjusting the at least one of the limiting of the regenerative braking torque variation rate and the lowering of the predetermined regenerative braking level.

For example, the control unit may limit the regenerative braking torque variation rate when the determined number of turn-on/off times of the brake lamp corresponds to a first section from among the plurality of predetermined sections.

For example, the control unit may lower the predetermined regenerative braking level when the determined number of turn-on/off times of the brake lamp corresponds to a second section having a greater range of turn-on/off times than the range of turn-on/off times of the first section.

For example, the control unit may limit the regenerative braking torque variation rate and may lower the predetermined regenerative braking level when the determined number of turn-on/off times of the brake lamp corresponds to a third section having a greater range of turn-on/off times than the range of turn-on/off times of the second section.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
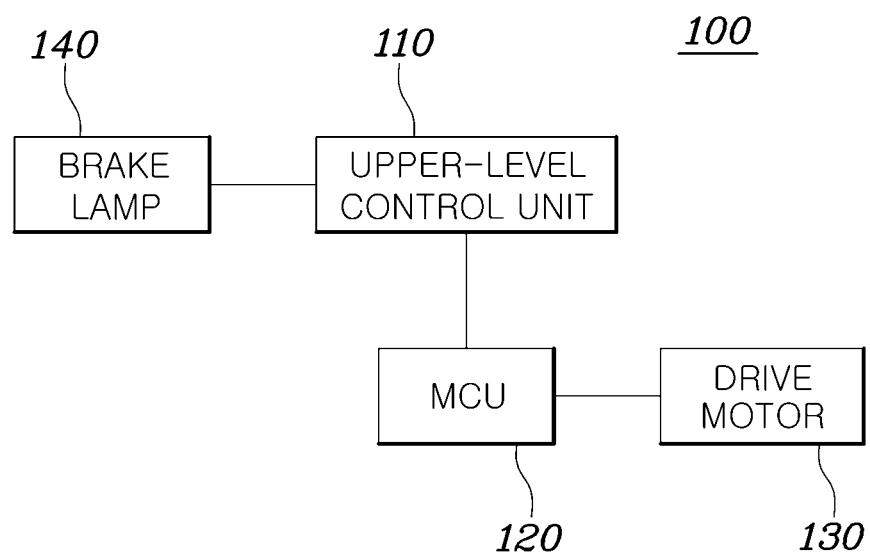
FIG. 1 is a block diagram of an electrified vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description of the exemplary embodiments of the present disclosure, a detailed description of known functions and configurations incorporated herein will be omitted when it may obscure the subject matter of the exemplary embodiments of the present disclosure. Furthermore, the exemplary embodiments of the present disclosure will be more clearly understood from the accompanying drawings and may not be limited by the accompanying drawings, and it is to be appreciated that all changes, equivalents, and substitutes that do not depart from the spirit and technical scope of the present disclosure are encompassed in the present disclosure It will be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

In the present specification, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Hereinafter, various embodiments of the present disclosure will be described in detail with reference to the accompanying drawings, and the same or similar elements are designated by the same reference numerals regardless of the numerals in the drawings and redundant description thereof will be omitted.

Furthermore, the term "unit" or "control unit" used in specific terminology such as a hybrid control unit (HCU), a vehicle control unit (VCU), or the like is only a term widely used for designation of a controller for controlling a function of a vehicle, and accordingly, does not mean a generic functional unit. For example, the controller may include a communication device configured to communicate with another controller or a sensor, for control of a function to be performed thereby, a memory configured to store an operating system, logic commands, input/output information, etc., and at least one processor configured to execute discrimination, calculation, determination, etc. required for control of the function to be performed.

First, a configuration of an electrified vehicle according to an exemplary embodiment of the present disclosure will be described with reference to FIG. 1.

FIG. 1 is a block diagram of the electrified vehicle according to the exemplary embodiment of the present disclosure.

Referring to FIG. 1, the electrified vehicle according to the exemplary embodiment of the present disclosure, which is designated by reference numeral "100", may include an upper-level control unit 110, a motor control unit (MCU) 120, a drive motor 130, and a brake lamp 140. Although FIG. 1 mainly shows constituent elements associated with the present exemplary embodiment of the present disclosure, the electrified vehicle 100 may include constituent elements less or more in number than those of the shown case when the electrified vehicle 100 is practically implemented.

Different controllers may function as the upper-level control unit 110 in accordance with kinds of vehicles, and accordingly, a vehicle control unit (VCU) may function as the upper-level control unit 110 in the case of an electric vehicle, whereas a hybrid control unit (HCU) may function as the upper-level control unit 110 in the case of a hybrid vehicle. The upper-level control unit 110 may determine required driving force of the vehicle in accordance with a value of an accelerator pedal sensor, and may determine required braking force in accordance with a value of a brake pedal position sensor (BPS). The upper-level control unit 110 may determine a driving torque or a regenerative braking torque to be output from the drive motor 130 in accordance with required driving force or required braking force, and may send, to the motor control unit 120, a torque command based on the determined driving torque or the determined regenerative braking torque.

Furthermore, the upper-level control unit 110 may determine regenerative braking torque required for simulation of creep torque or engine drag of an internal combustion engine in a coasting situation in which there is no pedal manipulation, using previously-stored data as to regenerative braking torques with respect to different vehicle speeds, and may send the determined regenerative braking torque to the motor control unit 120. This will be described with reference to FIG. 2.

Figure 2:
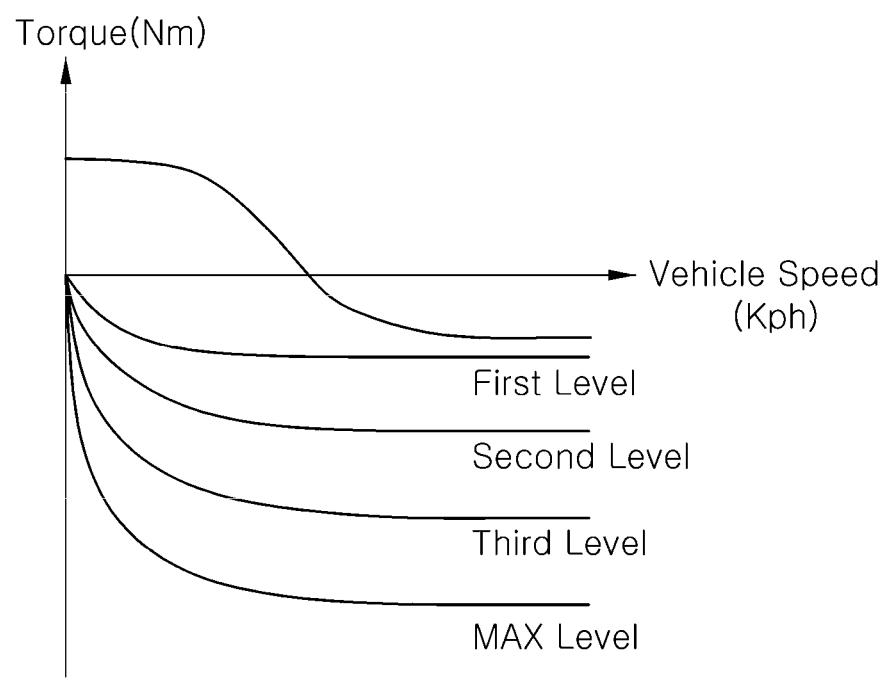
FIG. 2 is a graph depicting a profile of a regenerative braking torque with respect to a vehicle speed of the electrified vehicle according to the exemplary embodiment of the present disclosure.

FIG. 2 is a graph depicting a profile of a regenerative braking torque with respect to a vehicle speed of the electrified vehicle according to the exemplary embodiment of the present disclosure.

Referring to FIG. 2, data as to regenerative braking torques required with respect to different vehicle speeds on a level basis may be previously stored. A regenerative braking level may be set to one of a plurality of levels through manipulation of a predetermined manipulation device, for example, a paddle shifter or the like disposed at a steering wheel or a steering column. For example, the driver may adjust the regenerative braking level in a direction toward a higher level or a lower level during execution of regenerative braking through a manipulation device provided in the vehicle by determining a traffic situation or a road situation while driving of the vehicle. When the adjusted regenerative braking level is input through the manipulation device, the upper-level control unit 110 may control regenerative braking of the drive motor 130 to be performed by a regenerative braking torque corresponding to the current vehicle speed in accordance with the adjusted level. Of course, this is only illustrative, and a number of regenerative braking levels smaller or greater than that shown in FIG. 2 may be present.

When a deceleration by regenerative braking is higher than a predetermined value during execution of the above-described regenerative braking, the upper-level control unit 110 may control the brake lamp 140 to be turned on even though the brake pedal is not manipulated. In accordance with general laws and regulations, a predetermined value of equal to or greater than 0.7 m/s$^2$ may correspond to prohibition of lighting, a predetermined value of higher than 0.7 m/s$^2$, but equal to or lower than 1.3 m/s$^2$ may correspond to selective lighting allowance, and a predetermined value of higher than 1.3 m/s$^2$ may correspond to lighting compulsion. Of course, this is only illustrative, and the exemplary embodiments of the present disclosure are not limited thereto. Such lighting of the brake lamp by deceleration during the above-described regenerative braking will be described later in detail with reference to FIG. 3.

Meanwhile, the upper-level control unit 110 included in the electrified vehicle 100 may control regenerative braking to be performed not only in response to a driver's request (for example, manipulation of the brake pedal), but also through determination of a travel environment of the vehicle. For example, regenerative braking of the vehicle may be performed based on a distance from the electrified vehicle to a front vehicle, a collision time estimated based on the distance to the front vehicle, and navigation information. In the instant case, the navigation information may be traffic situation information or road information. Of course, this is only illustrative, and the travel environment of the vehicle is not limited to the above-described conditions, and various travel environments may be present. That is, the upper-level control unit 110 may set a regenerative braking level based on the travel environment of the vehicle, and may control regenerative braking to be performed in accordance with the set regenerative braking level when a situation requiring deceleration occurs while driving of the vehicle, even though the driver does not manipulate the brake pedal. The present function may be referred to as "smart regenerative braking".

Hereinafter, regenerative braking based on a travel environment of the vehicle will be described with reference to FIG. 3.

Figure 3:
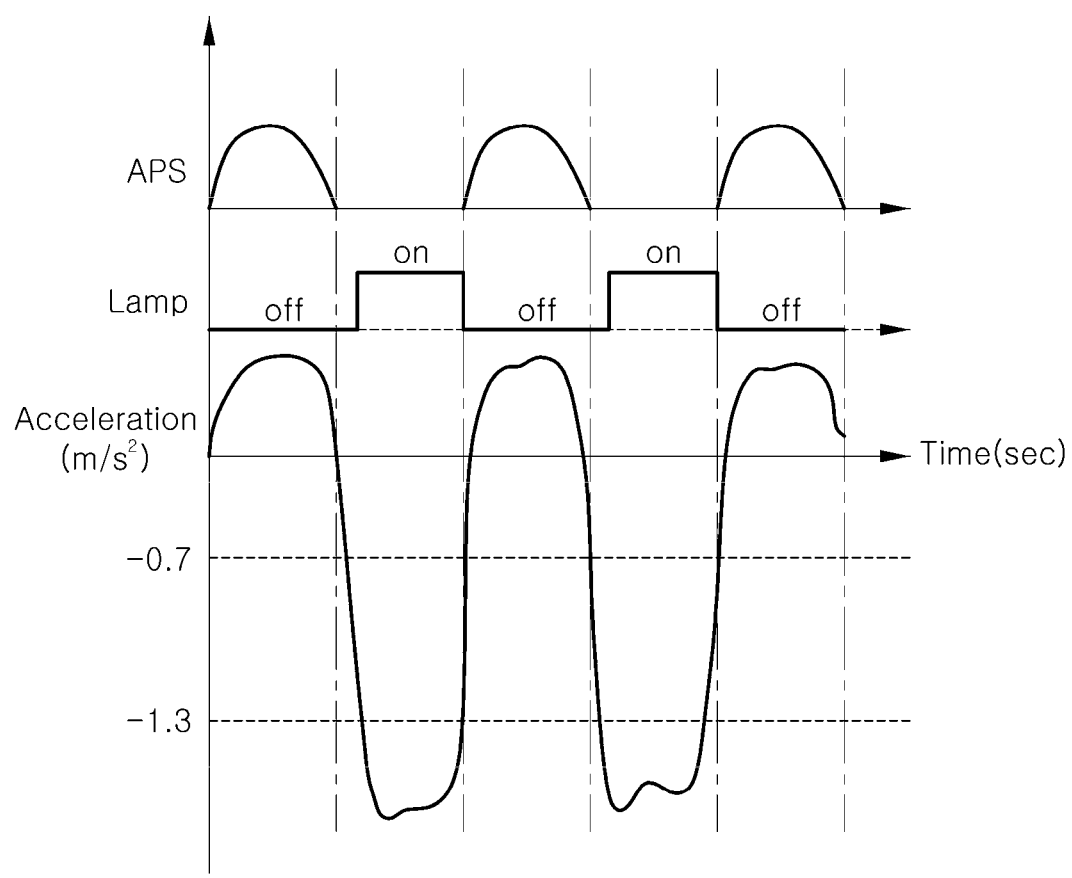
FIG. 3 is graphs depicting variations in states of constituent elements during execution of regenerative braking based on a travel environment of the electrified vehicle according to the exemplary embodiment of the present disclosure.

FIG. 3 is graphs depicting variations in states of constituent elements during execution of regenerative braking based on a travel environment of the electrified vehicle according to the exemplary embodiment of the present disclosure.

The graphs of FIG. 3 may depict a variation in a state of each constituent element exhibited as regenerative braking is not performed in response to a driver's request, but is performed based on a travel environment of the vehicle. In FIG. 3, horizontal axes represent time, and vertical axes represents a value of an accelerator pedal sensor (APS), a state of the brake lamp 140, and an acceleration of the vehicle, respectively. When the driver intermittently repeats manipulation of the accelerator pedal and release of the manipulation, a variation graph of the accelerator pedal sensor APS according to passage of time may have a graph form shown by an uppermost graph of FIG. 3. When the accelerator pedal sensor APS has a positive (+) value, the present value represents that the vehicle is being accelerated, and, accordingly, the brake lamp 140 may be maintained in an OFF state. However, when the driver releases manipulation of the accelerator pedal, regenerative braking may be performed based on a travel environment of the vehicle. In the instant case, deceleration lower than a predetermined reference may be generated due to execution of the regenerative braking, and, accordingly, the brake lamp 140 may be turned on (ON). For example, the upper-level control unit 110 may control the brake lamp 140 to be turned on when a deceleration of the vehicle exceeds 1.3 m/s$^2$.

The driver may repeat manipulation of the accelerator pedal and release of the manipulation in accordance with a travel environment of the vehicle, and regenerative braking of the drive motor 130 may be performed when manipulation of the accelerator pedal is released, and, accordingly, the vehicle is decelerated. As a result, turn-on/off of the brake lamp 140 may be repeated. As turn-on/off of the brake lamp 140 is repeated, the present phenomenon may be observed by a rear vehicle as if the brake lamp 140 flickers. As a result, there is a problem in that driving safety of the rear vehicle may be degraded. The present disclosure is directed to reduce the flickering phenomenon of the brake lamp 140 by determining the number of turn-on/off times of the brake lamp 140 in a situation in which regenerative braking is not performed in response to a driver's request, but is performed based on a travel environment of the vehicle, and adjusting a regenerative braking torque of the drive motor 130 based on the determined number of turn-on/off times. Here, the brake lamp 140 should be turned off when the accelerator pedal is manipulated, whereas the brake lamp 140 should be turned on when a deceleration exceeds a predetermined value. To achieve a reduction in the flickering phenomenon under the condition that restrictions as described above should be taken into consideration, it may be desirable that regenerative braking based on the travel environment be controlled so that the regenerative braking torque thereof is reduced, controlling the brake lamp 140 to be continuously maintained in an OFF state.

Hereinafter, a configuration of a control unit 400 configured to adjust a regenerative braking torque of the drive motor 130 based on the number of turn-on/off times of the brake lamp 140 will be described with reference to FIG. 4.

Figure 4:
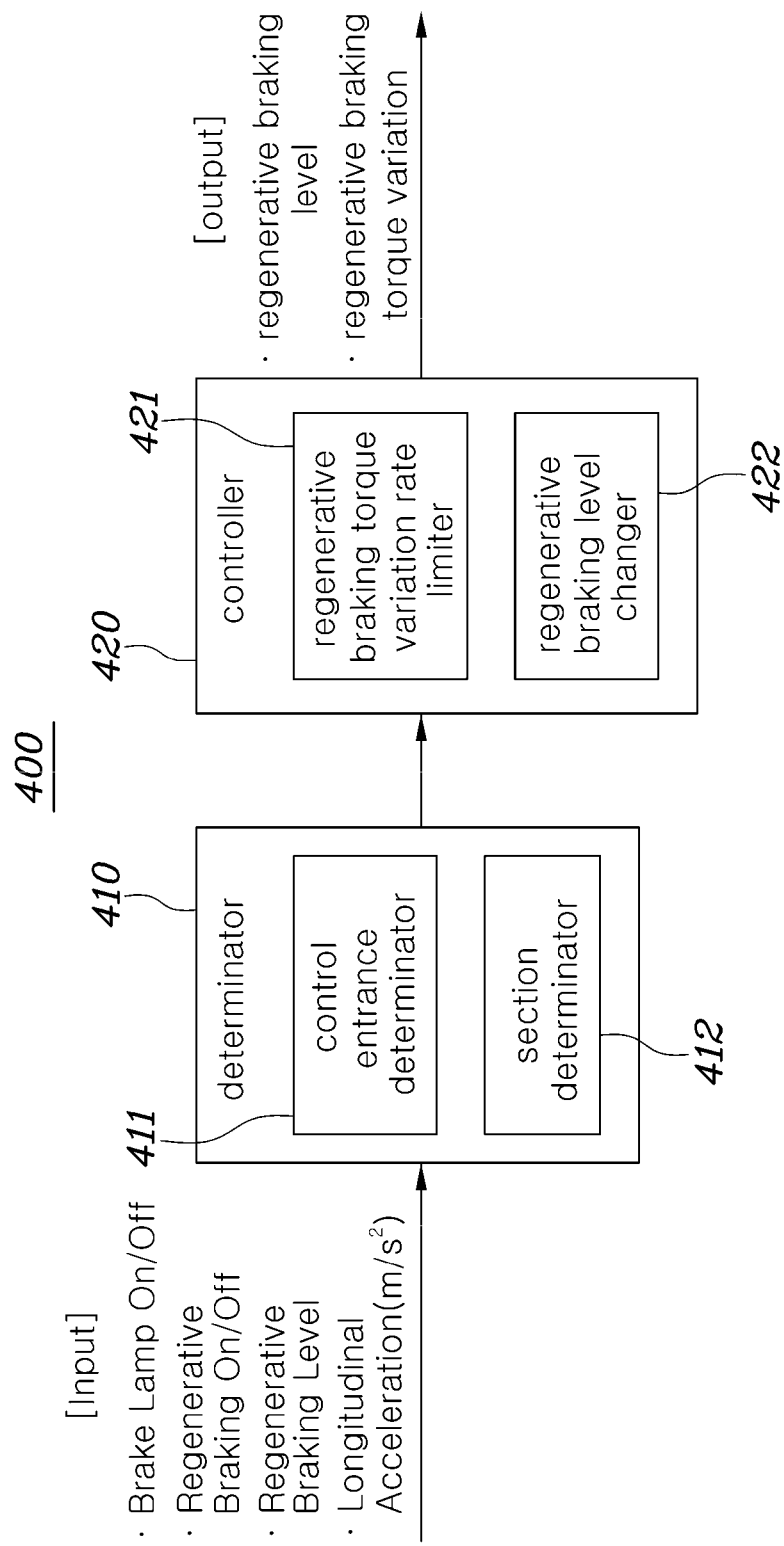
FIG. 4 is a block diagram of a control unit configured to perform regenerative braking control for the electrified vehicle in accordance with an exemplary embodiment of the present disclosure.

FIG. 4 is a block diagram of the control unit configured to perform regenerative braking control for the electrified vehicle in accordance with an exemplary embodiment of the present disclosure.

Referring to FIG. 4, the control unit 400 according to the exemplary embodiment of the present disclosure may determine the number of turn-on/off times of the brake lamp 140 for a reference time during execution of regenerative braking based on a travel environment while driving of the vehicle, and may adjust a regenerative braking torque of the drive motor 130 based on the determined number of turn-on/off times of the brake lamp 140. For these functions, the control unit 400 may include a determinator 410 and a controller 420. Furthermore, the determinator 410 may include a control entrance determinator 411 and a section determinator 412, whereas the controller 420 may include a regenerative braking torque variation rate limiter 421 and a regenerative braking level changer 422.

In detail, the determinator 410 may not only determine whether or not regenerative braking based on a travel environment of the vehicle is performed, but may also perform control section determination when it is necessary to adjust a regenerative braking torque of the drive motor 130, based on information input thereto. The control entrance determinator 411 may determine whether or not regenerative braking based on a travel environment of the vehicle is performed, based on information input thereto. For example, the travel environment may include at least one of a distance from the electrified vehicle to a front vehicle, an estimated collision time from the electrified vehicle to the front vehicle or navigation information. However, this is only illustrative, and a variety of travel environment information may be present. Furthermore, the control entrance determinator 411 may determine the number of turn-on/off times of the brake lamp 140 based on information as to turn-on/off of the brake lamp 140 during execution of regenerative braking based on the travel environment of the vehicle. In the instant case, the number of turn-on/off times of the brake lamp 140 may mean the number of times when the brake lamp 140 is switched from an ON state to an OFF state or from the OFF state to the ON state. The control entrance determinator 411 may provide the determined number of turn-on/off times of the brake lamp 140 to the section determinator 412.

When it is determined that regenerative braking based on the travel environment of the vehicle is performed, the section determinator 412 may determine a section in which a regenerative braking torque of the drive motor 130 should be adjusted, based on the number of turn-on/off times of the brake lamp 140 provided from the control entrance determinator 411. For the present function, a plurality of sections corresponding to different ranges of numbers of turn-on/off times may be set in the section determinator 412. For example, a plurality of numbers of turn-on/off times of the brake lamp 140 for division of the plurality of sections may be set to a first reference number of times, a second reference number of times, and a third reference number of times, respectively, and the second reference number of times may be greater than the first reference number of times, and the third reference number of times may be greater than the second reference number of times. Accordingly, the plurality of sections may be set to a first section corresponding to a range between the first reference number of times and the second reference number of times, a second section corresponding to a range between the second reference number of times and the third reference number of times, and a third section corresponding to a range exceeding the third reference number of times. Of course, this is only illustrative, division of a plurality of sections is not limited to the above-described method, and various division methods may be present. Accordingly, the section determinator 412 may determine, from among the plurality of sections, a section corresponding to the number of turn-on/off times of the brake lamp 140 provided from the control entrance determinator 411, and may then provide information as to the determined section to the controller 420.

The controller 420 may adjust a regenerative braking torque of the drive motor 130 in accordance with the section determined by the determinator 410. For example, the regenerative braking torque variation rate limiter 421 may control variation in regenerative braking torque per hour of the drive motor 130 to be limited, and the regenerative braking level changer 422 may control a previously set regenerative braking level to be lowered. The controller 420 may adjust a regenerative braking torque of the drive motor 130 through at least one of methods of the regenerative braking torque variation rate limiter 421 and the regenerative braking level changer 422 in accordance with the determined section. Furthermore, the controller 420 may adjust a regenerative braking torque of the drive motor 130 so that an acceleration of the vehicle according to regenerative braking becomes lower than a predetermined acceleration in accordance with the determined section. Thereafter, the controller 420 may output and provide information as to the regenerative braking torque variation rate determined by the regenerative braking torque variation rate limiter 421 and information as to the regenerative braking level determined by the regenerative braking level changer 422.

In implementation of the control unit 400, the control unit 400 may be the above-described upper-level control unit 110. Of course, this is only illustrative, and the exemplary embodiments of the present disclosure are not limited thereto. For example, the control unit 400 may be implemented as a controller separate from the upper-level control unit 110, or may be implemented as two or more different controllers with distributed functions.

Furthermore, in implementation of the present disclosure, the control unit 400 may provide control information, for example, a torque command, to the motor control unit 120, to achieve control through the motor control unit 120. Of course, this is only illustrative, and division of functions of the control unit 400 and the motor control unit 120 is not limited to the above-described content. For example, the function of the controller 420 of the control unit 400 may be implemented in the motor control unit 120.

Hereinafter, a regenerative braking control method of an electrified vehicle according to an exemplary embodiment of the present disclosure will be described in conjunction with the configuration of the electrified vehicle 100 described with reference to FIG. 1, FIG. 2, FIG. 3, and FIG. 4. For convenience of description, it is assumed in FIG. 5 that the control unit 400 of FIG. 4 is implemented as the upper-level control unit 110.

Figure 5:
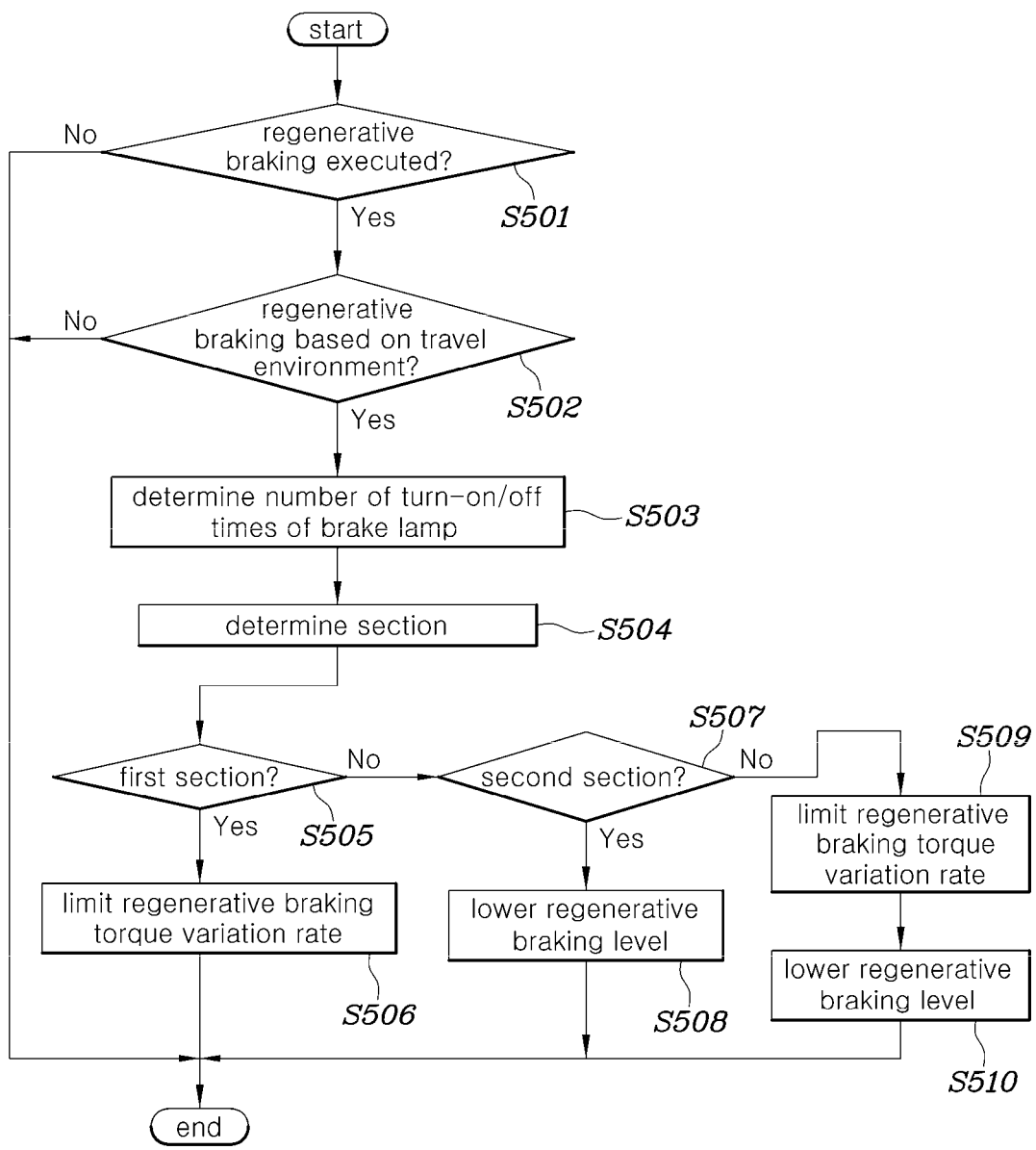
FIG. 5 is a flowchart of a regenerative braking control method of an electrified vehicle according to an exemplary embodiment of the present disclosure.

FIG. 5 is a flowchart of a regenerative braking control method of an electrified vehicle according to an exemplary embodiment of the present disclosure.

Referring to FIG. 5, when regenerative braking is performed ("Yes" in S501), the upper-level control unit 110 may determine whether the currently-performed regenerative braking is regenerative braking based on a driver's request or regenerative braking based on a travel environment of the vehicle (S502). When the currently-performed regenerative braking is not regenerative braking based on a driver's request, but is regenerative braking based on a travel environment of the vehicle ("Yes" in S502), the upper-level control unit 110 may perform control to adjust a regenerative braking torque of the drive motor 130 which will be described hereinafter.

When regenerative braking based on a travel environment of the vehicle is performed ("Yes" in S502), the upper-level control unit 110 may determine the number of turn-on/off times of the brake lamp 140 (S503). Furthermore, the upper-level control unit 110 may determine a section corresponding to the determined number of turn-on/off times of the brake lamp 140 from among a plurality of predetermined sections respectively including different ranges of numbers of turn-on/off times (S504).

Figure 6:
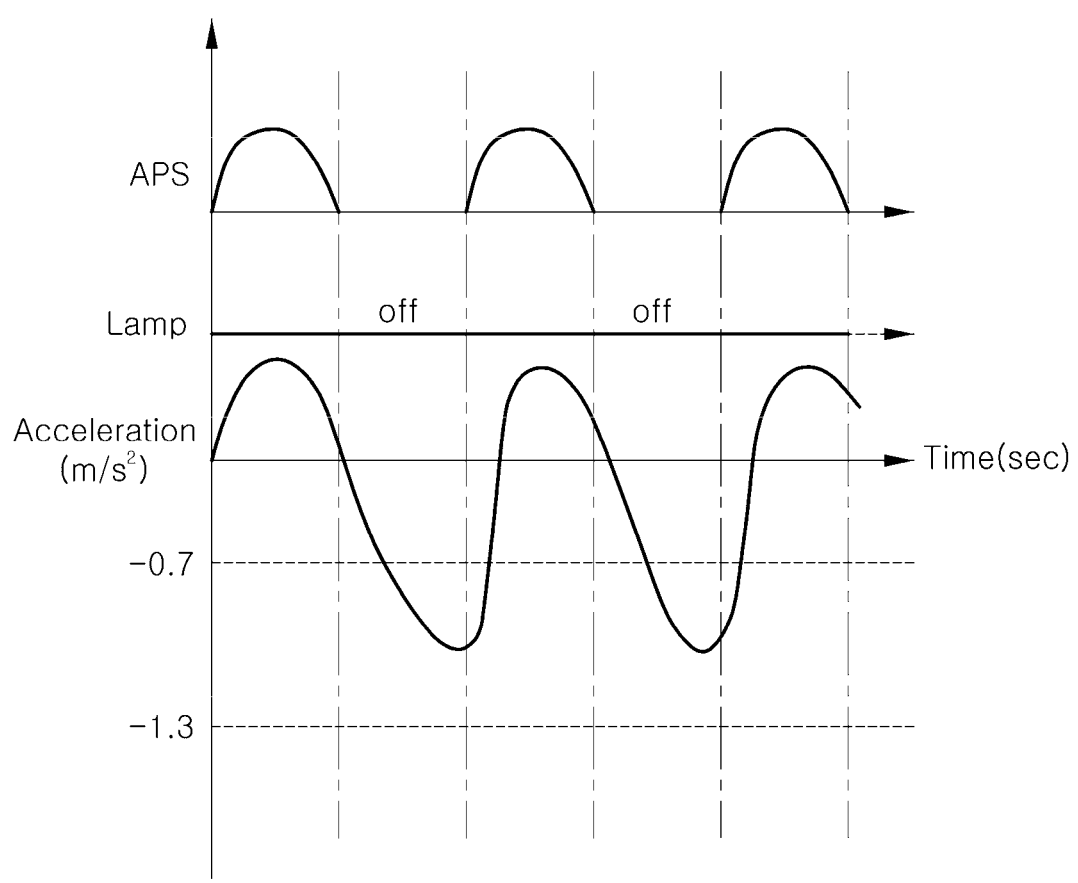
FIG. 6 and FIG. 7 are graphs depicting execution of regenerative braking varied through regenerative braking control of the electrified vehicle according to exemplary embodiments of the present disclosure.

When the determined number of turn-on/off times of the brake lamp 140 corresponds to the first section from among the plurality of sections ("Yes" in S505), the upper-level control unit 110 may limit a regenerative braking torque variation rate of the driver motor 130 (S506). When the determined number of turn-on/off times of the brake lamp 140 corresponds to the first section, the upper-level control unit 110 may perform control to reduce variation in regenerative braking torque per hour of the drive motor 130 in a negative (−) direction. Referring to FIG. 6, an aspect of the present variation may be seen.

Figure 7:
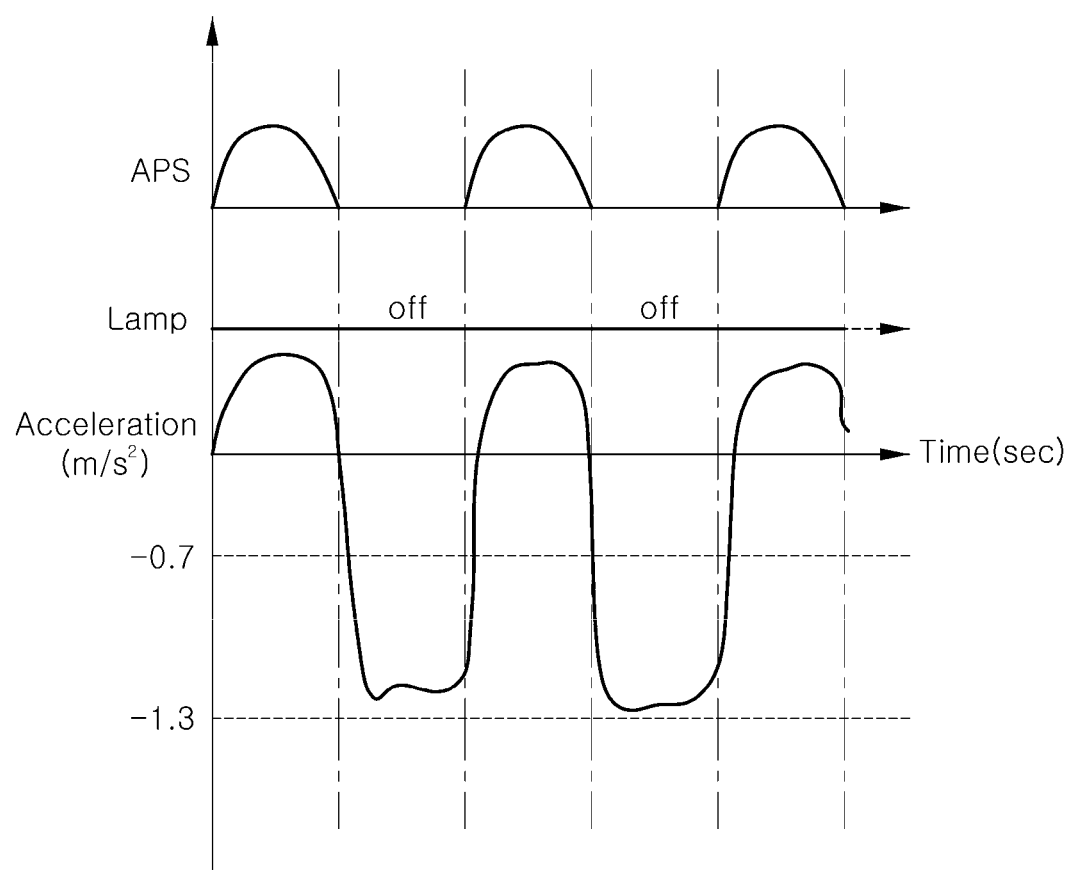

FIG. 6 and FIG. 7 are graphs depicting execution of regenerative braking varied through regenerative braking control of the electrified vehicle according to exemplary embodiments of the present disclosure.

Referring to FIG. 6, when the upper-level control unit 110 performs control to reduce variation in regenerative braking torque per hour of the drive motor 130 in a negative (−) direction, it may be possible to reduce the number of turn-on/off times of the brake lamp 140 in a state in which the accelerator pedal is not manipulated during execution of regenerative braking based on a travel environment. For example, when a deceleration, which is a reference for turn-on of the brake lamp 140 during execution of regenerative braking, is 1.3 m/s$^2$, the regenerative braking torque variation rate of the drive motor 130 is limited so that the deceleration caused by the regenerative braking does not exceed 1.3 m/s$^2$, that is, the reference deceleration. In the instant case, accordingly, the brake lamp 140 is not turned on, and accordingly, an OFF state of the brake lamp 140 may be continuously maintained.

However, when the number of turn-on/off times of the brake lamp 140 corresponds to the second section including a greater range of numbers of turn-on/off times than that of the first section ("No" in S505 and "Yes" in S507), the upper-level control unit 110 may perform control to lower a previously-set regenerative braking level (S508). For example, referring to FIG. 2, when the previously-set regenerative braking level of the drive motor 130 is the third level, the upper-level control unit 110 may perform control to lower the regenerative braking level to the first level or the second level. Referring to FIG. 7, an aspect of the present variation may be seen.

Referring to FIG. 7, as the upper-level control unit 110 lowers the previously-set regenerative braking level of the drive motor 130, it may be possible to reduce the number of turn-on/off times of the brake lamp 140 in a state in which the accelerator pedal is not manipulated during execution of regenerative braking based on a travel environment. As described above, it may be possible to prevent the deceleration caused by the regenerative braking from exceeding 1.3 m/s$^2$ by lowering the previously-set regenerative braking level. Accordingly, the brake lamp 140 is not turned on, and accordingly, an OFF state of the brake lamp 140 may be continuously maintained.

Furthermore, when the number of turn-on/off times of the brake lamp 140 corresponds to the third section including a greater range of numbers of turn-on/off times than that of the second section ("No" in S507), the upper-level control unit 110 may limit the regenerative braking torque variation rate of the drive motor 130 (S509), and may perform control to lower the previously-set regenerative braking level (S510). Thus, the upper-level control unit 110 may maintain the brake lamp 140 in an OFF state by adjusting the regenerative braking torque of the drive motor 130 during execution of regenerative braking based on the travel environment of the vehicle. Accordingly, it may be possible to prevent a flickering phenomenon of the brake lamp 140 and to enhance driving safety of a rear vehicle.

Meanwhile, although step S509 of limiting the regenerative braking torque variation rate of the drive motor 130 and step S510 of lowering the previously-set regenerative braking level have been described with reference to FIG. 5 as being sequentially performed, it is unnecessary to always sequentially perform these steps. For example, in the third section, both of the above-described control steps S509 and S510 may be performed because it is necessary to further limit the regenerative braking torque, as compared to the first and second sections. Accordingly, an execution order of step S509 of limiting the regenerative braking torque variation rate of the drive motor 130 and step S510 of lowering the previously-set regenerative braking level may be interchanged or these steps S509 and S510 may be simultaneously executed.

In accordance with the electrified vehicle and the regenerative braking control method thereof according to the exemplary embodiments of the present disclosure, a regenerative braking torque of the drive motor may be adjusted during execution of regenerative braking based on a travel environment of the vehicle, preventing a flickering phenomenon of the brake lamp unnecessarily occurring due to entrance and release of regenerative braking, and achieving an enhancement in driving safety of a rear vehicle.

Although the exemplary embodiments of the present disclosure have been included for illustrative purposes, those skilled in the art will appreciate that various modifications, additions and substitutions are possible, without departing from the scope and spirit of the present disclosure as included in the accompanying claims.

The present disclosure as described above may be embodied as computer-readable code, which may be written on a program-stored recording medium. The recording medium which may be read by a computer includes all kinds of recording media, on which data which may be read by a computer system is written. Examples of recording media which may be read by a computer may include a Hard Disk Drive (HDD), a solid state drive (SSD), a silicon disk drive (SDD), a read only memory (ROM), a random access memory (RAM), a CD-ROM, a magnetic tape, a floppy disk, an optical data storage, etc., and may include an exemplary embodiment including the form of a carrier wave (for example, transmission over the Internet). Furthermore, the computer may include a processor or a controller.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A regenerative braking control method of an electrified vehicle, the regenerative braking control method comprising:
performing, by a control unit, regenerative braking based on a travel environment while driving of the electrified vehicle;
determining, by the control unit, a number of turn-on/off times of a brake lamp for a reference time during execution of the regenerative braking based on the travel environment; and
adjusting, by the control unit, a regenerative braking torque of a drive motor based on the determined number of turn-on/off times of the brake lamp.

2. The regenerative braking control method of claim 1, wherein the travel environment includes at least one of a distance from the electrified vehicle to a front vehicle, an estimated collision time from the electrified vehicle to the front vehicle or navigation information.

3. The regenerative braking control method of claim 1, wherein the determining the number of turn-on/off times includes determining, as the number of turn-on/off times, a number of times when the brake lamp is switched from an ON state to an OFF state or from the OFF state to the ON state for the reference time during the execution of the regenerative braking of the electrified vehicle.

4. The regenerative braking control method of claim 1, wherein the adjusting the regenerative braking torque includes adjusting the regenerative braking torque of the drive motor in accordance with a section corresponding to the determined number of turn-on/off times of the brake lamp from among a plurality of predetermined sections respectively including different ranges of numbers of turn-on/off times.

5. The regenerative braking control method of claim 4, wherein the adjusting the regenerative braking torque of the drive motor in accordance with the section includes adjusting at least one of limiting of a regenerative braking torque variation rate and lowering of a predetermined regenerative braking level.

6. The regenerative braking control method of claim 5, wherein the adjusting the regenerative braking torque of the drive motor in accordance with the section further includes adjusting an acceleration of the electrified vehicle according to the regenerative braking to be lower than a predetermined acceleration by adjusting the at least one of the limiting of the regenerative braking torque variation rate and the lowering of the predetermined regenerative braking level.

7. The regenerative braking control method of claim 4, wherein the adjusting the regenerative braking torque further includes limiting a regenerative braking torque variation rate of the drive motor when the determined number of turn-on/off times of the brake lamp corresponds to a first section from among the plurality of predetermined sections.

8. The regenerative braking control method of claim 7, wherein the limiting the regenerative braking torque variation rate includes reducing variation in regenerative braking torque per hour of the drive motor in a negative (−) direction during the execution of the regenerative braking.

9. The regenerative braking control method of claim 7, wherein the adjusting the regenerative braking torque further includes lowering a predetermined regenerative braking level when the determined number of turn-on/off times of the brake lamp corresponds to a second section including a greater range of turn-on/off times than a range of turn-on/off times of the first section among the plurality of predetermined sections.

10. The regenerative braking control method of claim 9, wherein the adjusting the regenerative braking torque further includes the limiting the regenerative braking torque variation rate and the lowering the predetermined regenerative braking level when the determined number of turn-on/off times of the brake lamp corresponds to a third section including a greater range of turn-on/off times than the range of turn-on/off times of the second section among the plurality of predetermined sections.

11. A non-transitory computer readable storage medium on which a program for performing the method of claim 1 is recorded.

12. An electrified vehicle comprising:
a brake lamp configured to be repeatedly turned on or off in accordance with an acceleration and a deceleration of the electrified vehicle; and
a control unit configured to determine a number of turn-on/off times of the brake lamp for a reference time during execution of regenerative braking based on a travel environment while driving of the electrified vehicle and to adjust a regenerative braking torque of a drive motor based on the determined number of turn-on/off times of the brake lamp.

13. The electrified vehicle of claim 12, wherein the control unit is configured to determine, as the number of turn-on/off times, a number of times when the brake lamp is switched from an ON state to an OFF state or from the OFF state to the ON state for the reference time during the execution of the regenerative braking of the electrified vehicle.

14. The electrified vehicle of claim 12, wherein the control unit is configured to adjust the regenerative braking torque of the drive motor in accordance with a section corresponding to the determined number of turn-on/off times of the brake lamp from among a plurality of predetermined sections respectively including different ranges of numbers of turn-on/off times.

15. The electrified vehicle of claim 14, wherein, upon adjusting the regenerative braking torque of the drive motor, the control unit is configured to adjust at least one of limiting of a regenerative braking torque variation rate and lowering of a predetermined regenerative braking level.

16. The electrified vehicle of claim 15, wherein the control unit is configured to adjust an acceleration of the electrified vehicle according to the regenerative braking to be lower than a predetermined acceleration by adjusting the at least one of the limiting of the regenerative braking torque variation rate and the lowering of the predetermined regenerative braking level.

17. The electrified vehicle of claim 14, wherein the control unit is configured to limit a regenerative braking torque variation rate when the determined number of turn-on/off times of the brake lamp corresponds to a first section from among the plurality of predetermined sections.

18. The electrified vehicle of claim 17, wherein the control unit is configured to lower a predetermined regenerative braking level when the determined number of turn-on/off times of the brake lamp corresponds to a second section including a greater range of turn-on/off times than a range of turn-on/off times of the first section among the plurality of predetermined sections.

19. The electrified vehicle of claim 18, wherein the control unit is configured to limit the regenerative braking torque variation rate and to lower the predetermined regenerative braking level when the determined number of turn-on/off times of the brake lamp corresponds to a third section including a greater range of turn-on/off times than the range of turn-on/off times of the second section among the plurality of predetermined sections.

20. The electrified vehicle of claim 12, wherein the travel environment includes at least one of a distance from the electrified vehicle to a front vehicle, an estimated collision time from the electrified vehicle to the front vehicle or navigation information.

\* \* \* \* \*